H. A. Gouge,
House Ventilator,
No 47,633. Patented May 9, 1865.

Witnesses.
S. J. Gordon
Geo. H. Collins

Inventor.
H. A. Gouge

UNITED STATES PATENT OFFICE.

HENRY A. GOUGE, OF BROOKLYN, NEW YORK.

APPARATUS FOR VENTILATING.

Specification forming part of Letters Patent No. 47,633, dated May 9, 1865.

*To all whom it may concern:*

Be it known that I, HENRY A. GOUGE, of Brooklyn, Kings county, and State of New York, have invented a new and Improved Apparatus to Promote Ventilation; and I hereby declare that the following is a full, clear, and exact description thereof, reference being had to the accompanying drawings, making a part of this specification, and the letters of reference marked thereon, in which the same letter represents the same thing in each figure.

Figure 4:
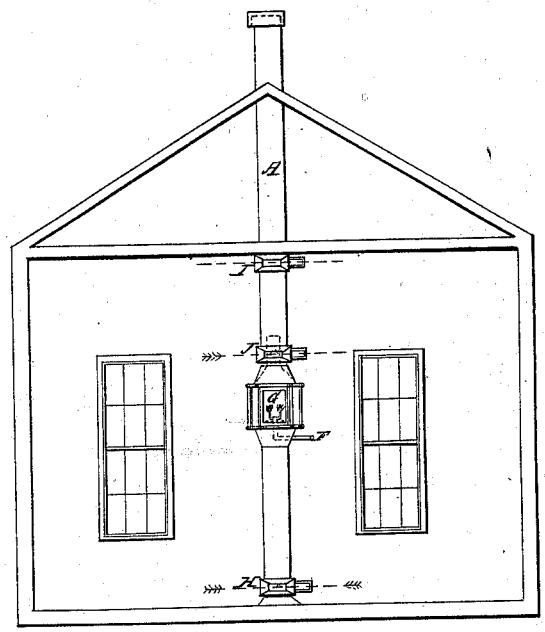
Figure 3:
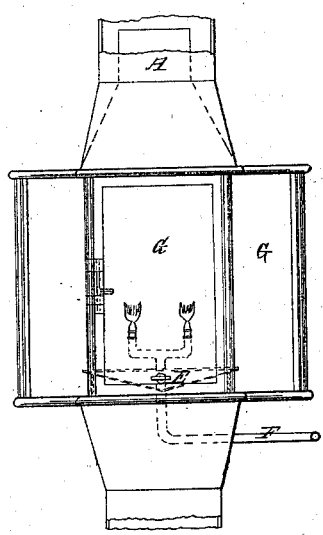
Figure 1:
Figure 2:
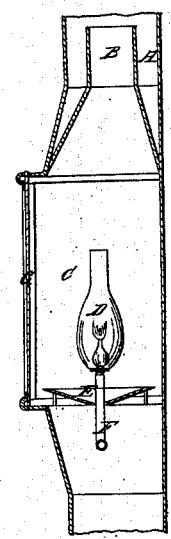

Figure 1 is a vertical cut section; Fig. 2, the same, showing the burner and draft-regulator; Fig. 3, a front view of a portion of the apparatus on an enlarged scale. Fig. 4 represents the apparatus attached to the wall of a room.

A represents a pipe or tube extending from the floor or near the floor of the apartment to be ventilated, along the interior or exterior surface, or within the wall of the apartment, if preferred, and communicating at its outlet with some other room or the open air by a chimney-flue or otherwise; B, an inner metal pipe above the gas-light, and extending sufficiently high to secure advantageous and safe combustion; C, a chamber containing the burner; D, the gas-burner; E, the inclined-plane draft-regulator; F, the gas-pipe; G, the metal or glass door of chamber C; H, the lower register; I, the upper register; J, the intermediate register.

It is well known that there are two kinds of noxious air in a close apartment, to be artificially removed—one dense and heavy, near the floor, known as "carbonic-acid gas," the other light and hot, near the ceiling, known as "exhausted air." My apparatus is designed to economically and surely remove both, as follows: Light burner D; open register H, the current of air through which and pipe A will promote combustion, while the intensity of the current will be moderated and controlled by the four-sided inclined-plane regulator E, which, being largest at the top, will so check and diffuse the ascending current that it will reach the burner in a steady and even flow, so that regular combustion may not be disturbed. The air in chamber C being thus rapidly heated and rarefied, and also that in protecting metal pipe B, will rise and pass off through the upper part of pipe A, creating a current into which, by opening either register I, when it is desired to quickly cool a room, or register J, when it is wished to purify the air and save as much heat as possible, or both, if desired, the air in the upper part of the room containing the noxious gases will be sucked by its ascending power.

What I claim, and desire to secure by Letters Patent, is—

1. The apparatus described, when constructed to promote ventilation, with substantially the parts operating in substantially the manner explained.

2. The inclined-plane current-controller E, arranged substantially as and for the purposes shown.

H. A. GOUGE.

Witnesses:
S. J. GORDON,
GEO. H. COLLINS.